United States Patent
Zhao et al.

(10) Patent No.: US 12,299,417 B2
(45) Date of Patent: May 13, 2025

(54) VISUAL PROGRAMMING FOR INDUSTRIAL SYSTEMS

(71) Applicant: ROCKWELL AUTOMATION TECHNOLOGIES, INC., Mayfield Heights, OH (US)

(72) Inventors: Hongbo Zhao, Dalian (CN); Liangxin Lu, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 16 days.

(21) Appl. No.: 18/141,755

(22) Filed: May 1, 2023

(65) Prior Publication Data
US 2024/0370231 A1    Nov. 7, 2024

(51) Int. Cl.
*G06F 8/34* (2018.01)
*G06F 8/20* (2018.01)
*G06F 8/65* (2018.01)

(52) U.S. Cl.
CPC .................. *G06F 8/34* (2013.01); *G06F 8/20* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 2015/0067657 | A1* | 3/2015 | Girouard | G06F 3/1273 717/140 |
| 2017/0235963 | A1* | 8/2017 | Ahn | H04L 9/14 713/190 |
| 2018/0267779 | A1* | 9/2018 | Leonelli | G06F 11/3664 |
| 2021/0303452 | A1* | 9/2021 | Shi | G06F 11/26 |

OTHER PUBLICATIONS

Google Developers, Blockly, Retrieved from https://developers.google.com/blockly, Accessed on Oct. 15, 2024, 12 pages.
Github, Blockly for Structured Text, Retrieved from https://github.com/fvito/blockly-for-structured-text, Accessed on Oct. 15, 2024, 2 pages.

* cited by examiner

*Primary Examiner* — Toan H Vu
(74) *Attorney, Agent, or Firm* — Quarles & Brady LLP

(57) ABSTRACT

Systems and methods of visual programming for industrial systems. One system includes an electronic processor configured to generate a graphical user interface (GUI) for programming an industrial controller. The electronic processor is also configured to receive a selection of a function associated with a set of computer executable instructions. The electronic processor is also configured to generate a graphical representation of the function, the graphical representation including a set of interactive components for receiving one or more parameters specific to configuring the function. The electronic processor is also configured to receive a set of parameters for configuring the function and generate a code file for executing the function based on the set of parameters.

18 Claims, 12 Drawing Sheets

```
1
2  If trig then
3
4
5      IF TON_4.Q THEN
6
7          k := k + 1;
8
9      END_IF;
10
11     TON_4(Not(TON_4.Q),T#20000ms);
12
13
14 End_if;
15
```

FIG. 10B

VISUAL PROGRAMMING FOR INDUSTRIAL SYSTEMS

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to visual programming for industrial controllers within industrial systems.

Current industrial device programming and configuration environments may involve programming industrial controllers (e.g., programmable logic controller ("PLCs")) using specific programming languages. Some example PLC programming languages may include a ladder diagram programming language, a structure text programming language, etc. Ladder diagram based programming languages are different from mainstream programming languages. Structure text based programming languages are not easy to learn and understand and may necessitate a user to poses a certain level of programming experience and skill. The current PLC programming languages are hand-code languages, which results in low programming productivity. Additionally, some industrial device configurations may be too complex for current PLC programming languages. For instance, industrial device configurations related to motion applications may be too complex.

As a result, in order to for a user to program an industrial device using current PLC programming languages, the user may need to have a robust and heavy knowledge of operation technology ("OT"), which may involve a long learning curve. Further, in the information technology ("IT") and OT context, current PLC programming languages are not user-friendly for users having an IT background.

To solve these and other technical problems associated with current programming languages, the technology disclosed herein include methods and systems that provide visual programming for industrial systems. In some configurations, the technology disclosed herein may provide visual programming via a block program editor. The block program editor may provide visual programming functionality by representing executable code as interactive blocks in a graphical user interface ("GUI"). By representing executable code as interactive blocks visually through a graphical user interface, the technology disclosed herein (e.g., via the block program editor) enables a lower entry-barrier such that users of varied experience levels may create or modify software applications. Additionally, the technology disclosed herein (e.g., via the block program editor) may enable a user to convert a software application between complex structure text to user-friendly graphical interactive blocks (and vice versa).

Accordingly, the technology disclosed herein provides several advantages and technical improvements over prior industrial controller (e.g., PLC) programming languages. For instance, the technology disclosed herein provide several user-experience innovations to provide a better and more efficient user experience. As one example, a user does not have to have a robust programming background. For instance, the technology disclosed herein may facilitate software application code with improved readability and understanding, such as, e.g., by users how have a basic programming knowledge. As another example, the technology disclosed herein facilitates improved code structure organization, such as, e.g., through customizable and definable code sections.

The technology disclosed herein provides systems and methods of providing visual programming for industrial systems. One configuration provides a system of providing visual programming for industrial systems. The system includes an electronic processor configured to generate a graphical user interface (GUI) for programming an industrial controller. The electronic processor is also configured to receive a first selection of a first function from a plurality of functions, wherein each function of the plurality of functions is associated with a set of computer executable instructions. The electronic processor is also configured to generate, within the GUI, a first graphical representation of the first function, the first graphical representation including a first set of interactive components for receiving one or more parameters specific to configuring the first function. The electronic processor is also configured to receive, via the first set of interactive components, a first set of parameters for configuring the first function. The electronic processor is also configured to generate a code file for executing the first function based on the first set of parameters.

Another configuration provides a method of providing visual programming for industrial systems. The method includes generating, with an electronic processor, a graphical user interface (GUI) for programming an industrial controller. The method also includes receiving, with the electronic processor, a selection of a function from a plurality of functions, wherein each function of the plurality of functions is associated with a set of computer executable instructions. The method also includes generating, with the electronic processor, within the GUI, a graphical representation of the function, the graphical representation including a set of interactive components for receiving one or more parameters specific to configuring the function. The method also includes receiving, with the electronic processor, via the set of interactive components, a set of parameters for configuring the function. The method also includes generating, with the electronic processor, a code file for executing the function based on the set of parameters. The method also includes deploying, with the electronic processor, the code file via the industrial controller for implementation within an industrial system.

Yet another configuration provides a non-transitory, computer-readable medium storing instructions that, when executed by an electronic processor, perform a set of functions. The set of functions includes generating a graphical user interface (GUI) for programming an industrial controller. The set of functions also includes receiving a first selection of a first function from a plurality of functions, wherein each function of the plurality of functions is associated with a set of computer executable instructions. The set of functions also includes generating within the GUI, a first graphical representation of the first function, the first graphical representation including a first set of interactive components for receiving one or more parameters specific to configuring the first function. The set of functions also includes receiving via the first set of interactive components, a first set of parameters for configuring the first function. The set of functions also includes generating a code file for executing the first function based on the first set of parameters. The set of functions also includes deploying the code file via the industrial controller for implementation within an industrial system.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects, and advantages other than those set forth above will become apparent when consideration is given to the following detailed description thereof. Such detailed description makes reference to the following drawings.

FIG. 10B illustrates the delay function as structured text according to some configurations.

DETAILED DESCRIPTION

Figure 1:
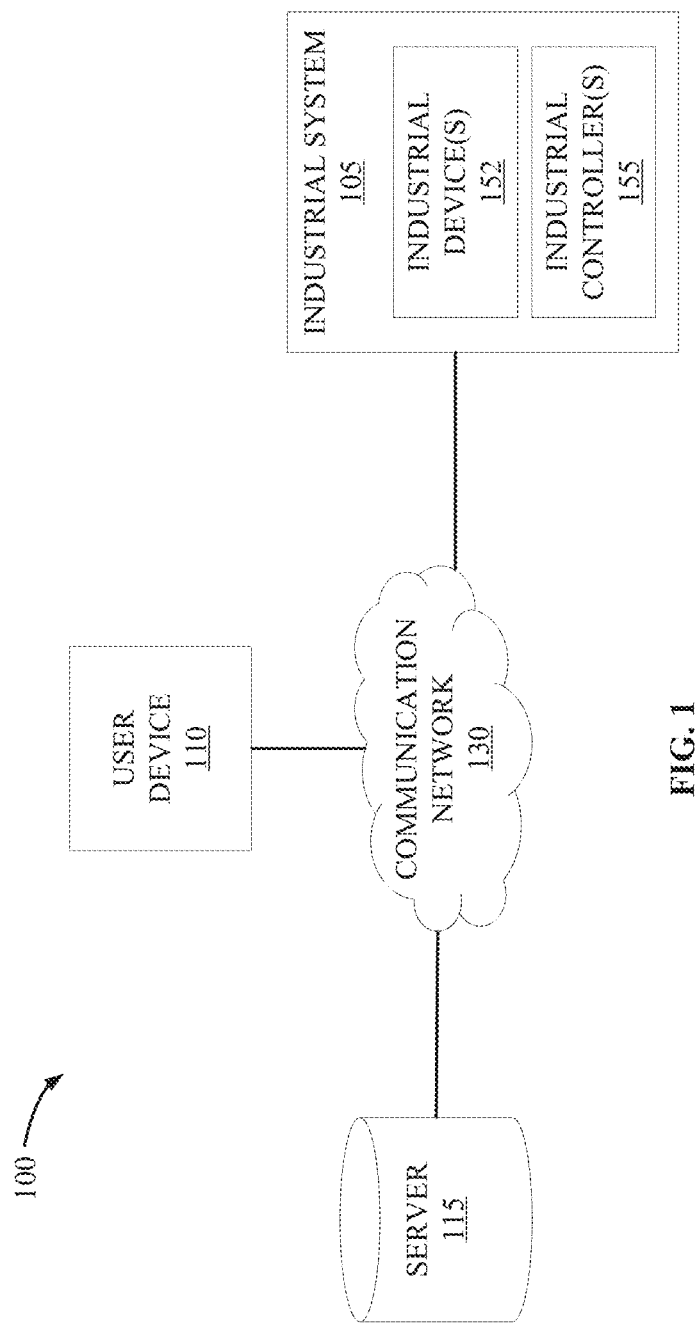
FIG. 1 schematically illustrates a system for providing visual programming for industrial systems according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for providing visual programming for industrial systems according to some configurations. In the illustrated example, the system 100 may include an industrial system 105, a user device 110, and a server 115. In some embodiments, the system 100 includes fewer, additional, or different components in different configurations than illustrated in FIG. 1. As one example, the system 100 may include multiple industrial systems 105, multiple user devices 110, multiple servers 115, or a combination thereof. As another example, one or more components of the system 100 may be combined into a single device, such as, e.g., the user device 110 and the server 115. Alternatively, or in addition, in some configurations, the user device 110, the server 115, or a combination thereof may be included as part of the industrial system 105 (e.g., as a component of the industrial system 105).

The industrial system 105, the user device 110, and the server 115 may communicate over one or more wired or wireless communication networks 130. Portions of the communication networks 130 may be implemented using a wide area network, such as the Internet, a local area network, such as BLUETOOTH® or WI-FI®, and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may be associated with multiple industrial systems 105 (e.g., a first industrial system, a second industrial system, a third industrial system, etc.). Accordingly, in some configurations, the industrial system 105 may be implemented at a facility. Alternatively, or in addition, in some configurations, the system 100 may include a first industrial system located at a first facility and a second industrial system located as a second facility different from the first facility. The industrial system 105 may be configured to perform one or more industrial processes, manufacturing processes, production processes, or the like. In some configurations, the industrial system 105 may perform a production method that produces goods or products. As one example, the industrial system 105 may perform a vehicle manufacturing processor to assemble or produce a vehicle (or various components thereof). As another example, the industrial system 105 may perform a food manufacturing process for making a food product. As yet another example, the industrial system 105 may perform a pharmaceutical manufacturing process for producing pharmaceuticals.

In the illustrated example, the industrial system 105 may include one or more industrial devices 152 (referred to herein collectively as "the industrial devices 152" and individually as "the industrial device 152") and one or more industrial controllers 155 (referred to herein collectively as "the industrial controllers 155" and individually as "the industrial controller 155"). The industrial device 152, the industrial controller 155, or a combination thereof may be a physical piece of equipment included in the industrial system 105. For example, an industrial device 152 may include a pump, a press, a conveyor, a valve, a switch, a sensor, a server, a database, a human-machine interface ("HMI"), another piece of equipment that may be used in connection with an associated industrial process or application of the industrial system 105, or the like. The industrial controller 155 may be a programmable logic controller ("PLC") or the like. In some configurations, the industrial controller 155 may be communicatively coupled to at least one industrial device 152 included in the industrial system 105 such that the industrial controller 155 may control an operation or functionality associated with the at least one industrial device 152 included in the industrial system 105.

Figure 2:
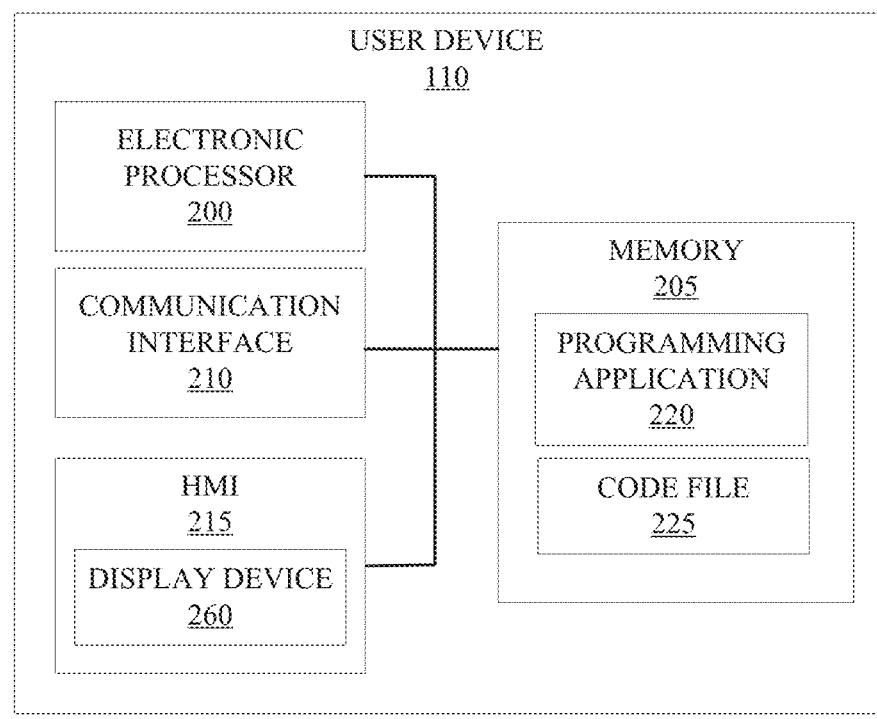
FIG. 2 schematically illustrates a user device included in the system of FIG. 1 according to some configurations.

The user device 110 may be a computing device, such as a desktop computer, a laptop computer, a tablet computer, a terminal, a smart telephone, a smart television, a smart wearable, or another suitable computing device that interfaces with a user. As illustrated in FIG. 2, the user device 110 may include an electronic processor 200, a memory 205, and a communication interface 210, and a human-machine interface ("HMI") 215. The electronic processor 200, the memory 205, the communication interface 210, and the HMI 215 may communicate wirelessly, over one or more communication lines or buses, or a combination thereof. The user device 110 may include additional components than those illustrated in FIG. 2 in various configurations. The user device 110 may also perform additional functionality other than the functionality described herein. Also, the functionality (or a portion thereof) described herein as being performed by the user device 110 may be distributed among multiple devices (e.g., as part of a cloud service or cloud-computing environment), combined with another component of the system 100 (e.g., combined with the server 115, another component of the system 100, another remote device, or the like), or a combination thereof.

The communication interface 210 may include a transceiver that communicates with the industrial system 105, the server 115, or a combination thereof over the communication network 130 and, optionally, one or more other communication networks or connections. In some configurations, the communication interface 210 enables the user device 110 to communicate with the industrial system 105, the server 115, or a combination thereof over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one example, as illustrated in FIG. 2, the memory 205 may include a programming application 220 (referred to herein as "the application 220") and one or more code file(s) 225. Although FIG. 2 illustrates the application 220 and the code file(s) 225 as being stored in the memory 205, in some configurations, the application 220, the code file(s) 225, or a combination thereof may be stored external to the memory 205, such as in one or more remote devices (e.g., the server 115).

The application 220 may be a software application executable by the electronic processor 200 in the example illustrated and as specifically discussed below, although a similarly purposed module may be implemented in other ways in other examples. The electronic processor 200 may execute the application 220 to provide a programming environment where a user may develop software (e.g., the code file(s) 225) for the industrial system 105 (or one or more of the industrial devices 152, the industrial controllers 155, or a combination thereof), as described in greater detail herein. In some configurations, the application 220 may be a web-browser application that enables access and interaction with a programming environment, such as, e.g., a programming environment associated with the server 115 (e.g., where the programming environment is a web-based service). Alternatively, or in addition, the application 220 may be a dedicated software application that enables access and interaction with a programming environment, such as, e.g., a programming environment associated with (or hosted by) the server 115. Accordingly, in some configurations, the application 220 may function as a software application that enables access to a programming environment or service provided by the server 115.

The code file(s) 225 may be an electronic file including a set (or sequence) of machine-readable or executable instructions for performing a task or function. In some configurations, the code file 225 may be deployed within the industrial system 105 for controlling a component thereof (e.g., the industrial device(s) 152, the industrial controller(s) 155, etc.). As one example, the code file 225 may be a PLC control program for the industrial controller 155, such that, when downloaded to and executed by the industrial controller 155, the industrial controller 155 performs tasks or functionality pursuant to the PLC control program.

As illustrated in FIG. 2, the user device 110 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 110. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof. As illustrated in FIG. 2, in some configurations, the HMI 215 includes a display device 260. The display device 260 may be included in the same housing as the user device 110 or may communicate with the user device 110 over one or more wired or wireless connections. For example, in some configurations, the display device 260 is a touchscreen included in a laptop computer or a tablet computer. In other configurations, the display device 260 is a monitor, a television, or a projector coupled to a terminal, desktop computer, or the like via one or more cables.

Returning to FIG. 1, the system 100 may also include the server 115. The server 115 may be a computing device. Although not illustrated in FIG. 1, the server 115 may include similar components as the user device 110, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more HMIs. For example, to communicate with the user device 110, the server 115 may store a browser application or a dedicated software application executable by an electronic processor. The server 115 may host or otherwise provide at least one programming environment or service. Accordingly, in some configurations, the server 115 is associated with a programming environment (e.g., included as a component, device, or subsystem of a system providing or hosting a programming environment or service). Alternatively, or in addition, in some configurations, the functionality described herein as being performed by the user device 110 may be locally performed by the server 115. For example, in some configurations, the server 115 may store the application 220.

Figure 3:
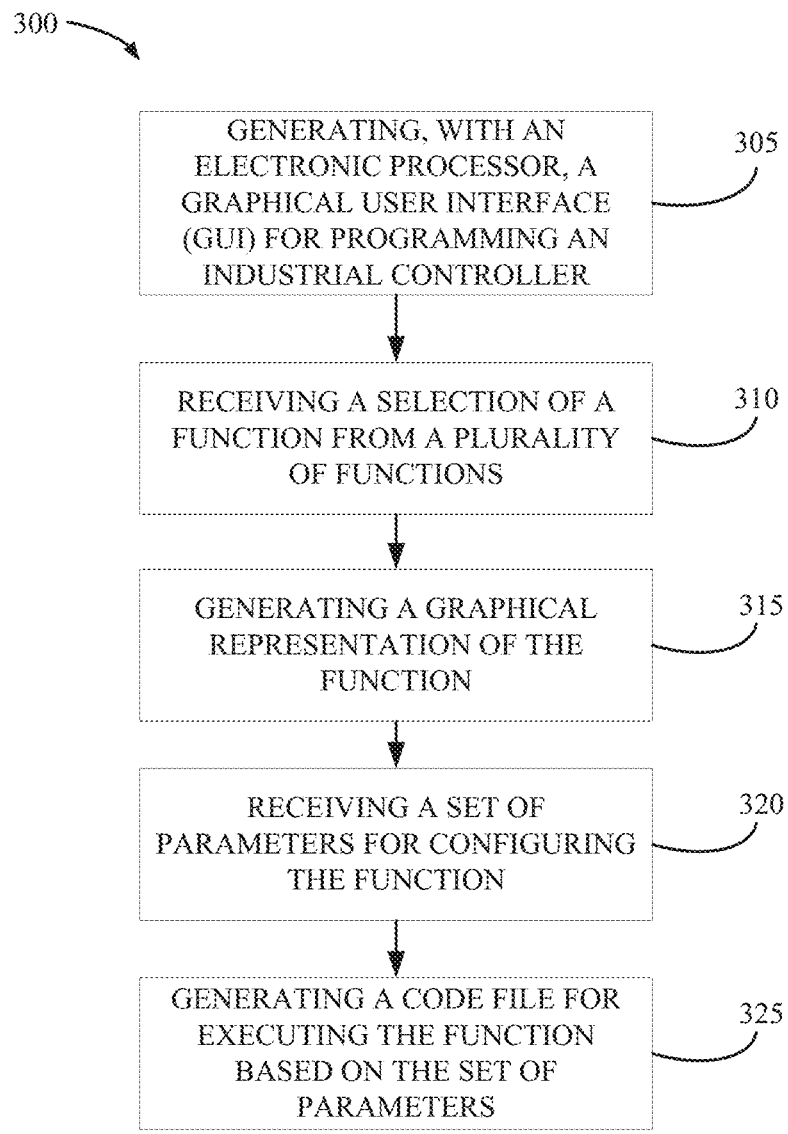
FIG. 3 is a flowchart illustrating a method for providing visual programming for industrial systems according to some configurations.

FIG. 3 is a flowchart illustrating a method 300 of providing visual programming for the industrial system 105 (or one or more of the industrial devices 152, the industrial controllers 155, or a combination thereof) according to some configurations. The method 300 is described as being performed by the user device 110 and, in particular, the electronic processor 200. However, as noted herein, the functionality described with respect to the method 300 may be performed by other devices, such as the server 115, a component included in the industrial system 105, or a combination thereof, distributed among a plurality of devices, such as a plurality of servers included in a cloud service, or a combination thereof. The method 300 is described herein as being performed by the user device 110 for programming of the industrial controller 155. However, in some configurations, the method 300 may be performed for programming another component of the industrial system 105, including, e.g., one or more of the industrial devices 152.

As illustrated in FIG. 3, the method 300 may include generating, with the electronic processor 200, a graphical user interface (GUI) for programming the industrial controller 155 (at block 305). In some configurations, the electronic processor 200 may transmit (or otherwise provide) the GUI for display to a user. As one example, the electronic processor 200 may provide the GUI to the display device 260 for display to a user of the user device 110. As another example, the electronic processor 200 may transmit the GUI to a remote device for display to a user via a display device of the remote device. As described in greater detail herein, a user may interact with the GUI (e.g., via the HMI 215) to develop or build executable code for programming the industrial controller 155.

Figure 4:
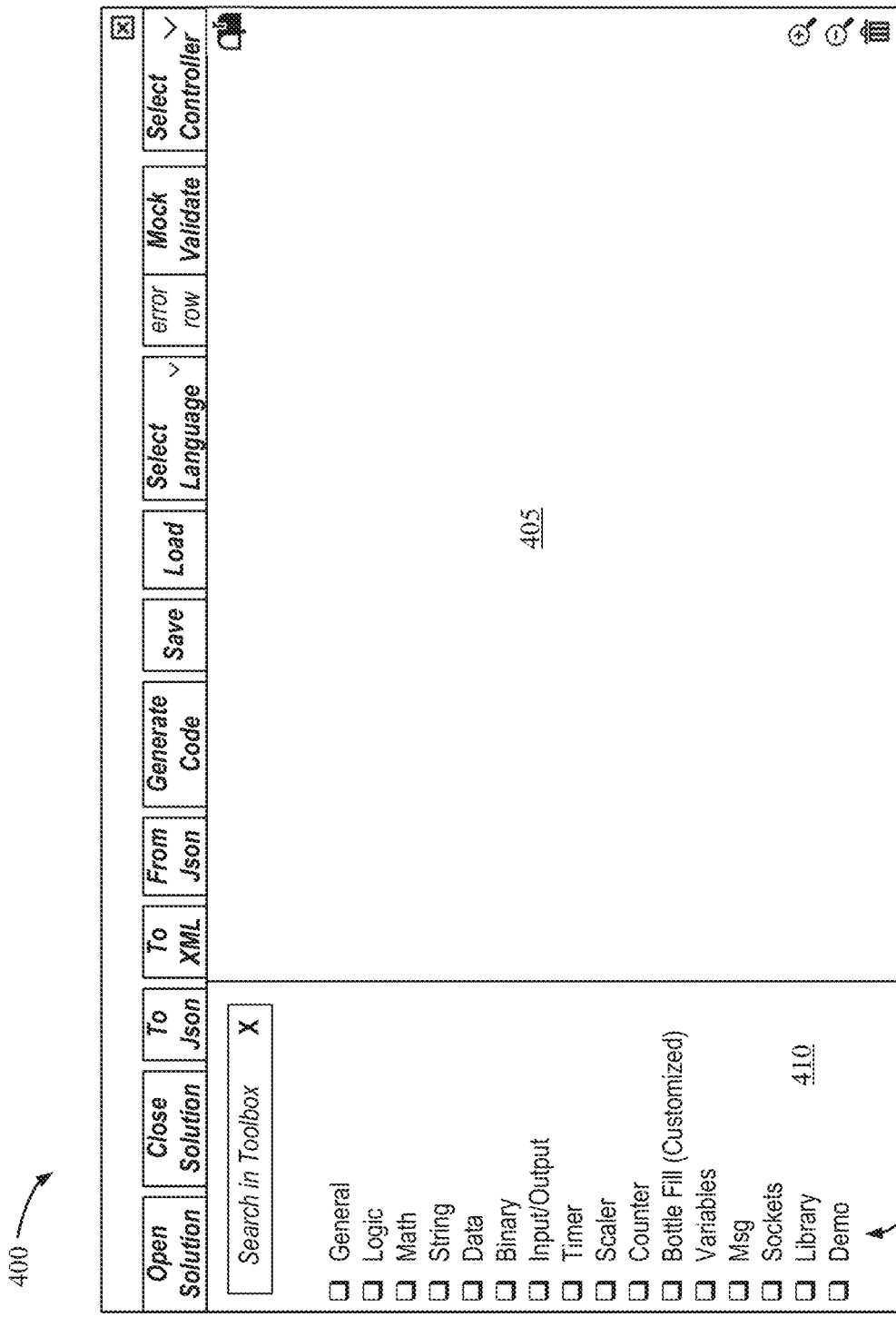
FIG. 4 illustrates an example graphical user interface for visually programming an industrial system according to some configurations.

As one example, FIG. 4 illustrates an example GUI 400 for visually programming the industrial system 105 according to some configurations. The GUI 400 is described as herein with respect to visually programming the industrial controller 155. However, in some configurations, the GUI 400 (including the visual programming functionality described herein) may be implemented with respect to visually programming other components of industrial systems (e.g., the industrial device(s) 152, another component of the industrial system 105, etc.).

As illustrated in FIG. 4, the GUI 400 may include a code editing workspace 405 (referred to herein as "the workspace 405") and a selection panel 410. The workspace 405 may be an area or portion of the GUI 400 in which a user may perform one or more coding actions or tasks, such as, e.g., by interacting with one or more graphical representations of coding segment, as described in greater detail herein. The selection panel 410 may be an area or portion of the GUI 400 in which a user may interact with a set of function categories 415. A function category may be associated with a particular category or class of programming functionality or functions. For example, as illustrated in FIG. 4, the set of function categories 415 includes a listing of function categories, such as, e.g., a general category, a logic category, a math category, a string category, a data category, a binary category, an input/output category, a timer category, a scaler category, a counter category, a customized category (e.g., a Bottle Fill category, as illustrated in FIG. 4), a variables category, a message (Msg) category, a sockets category, a library category, and a demo category. In some configurations, the selection panel 410 may include additional, different, or fewer function categories than illustrated in FIG. 4 in various configurations.

Returning to FIG. 3, the electronic processor 200 may receive a selection of a function from a plurality of functions (at block 310). In some configurations, the electronic processor 200 may receive (or detect) a user interaction or input with the GUI, where the user interaction or input is a selection of a function from a plurality of functions. Accordingly, in some configurations, a user may select (via the HMI 215) a function displayed or otherwise included in the GUI. A function may include a set of computer executable instructions that, when executed, perform functionality associated with the function.

Figure 5:
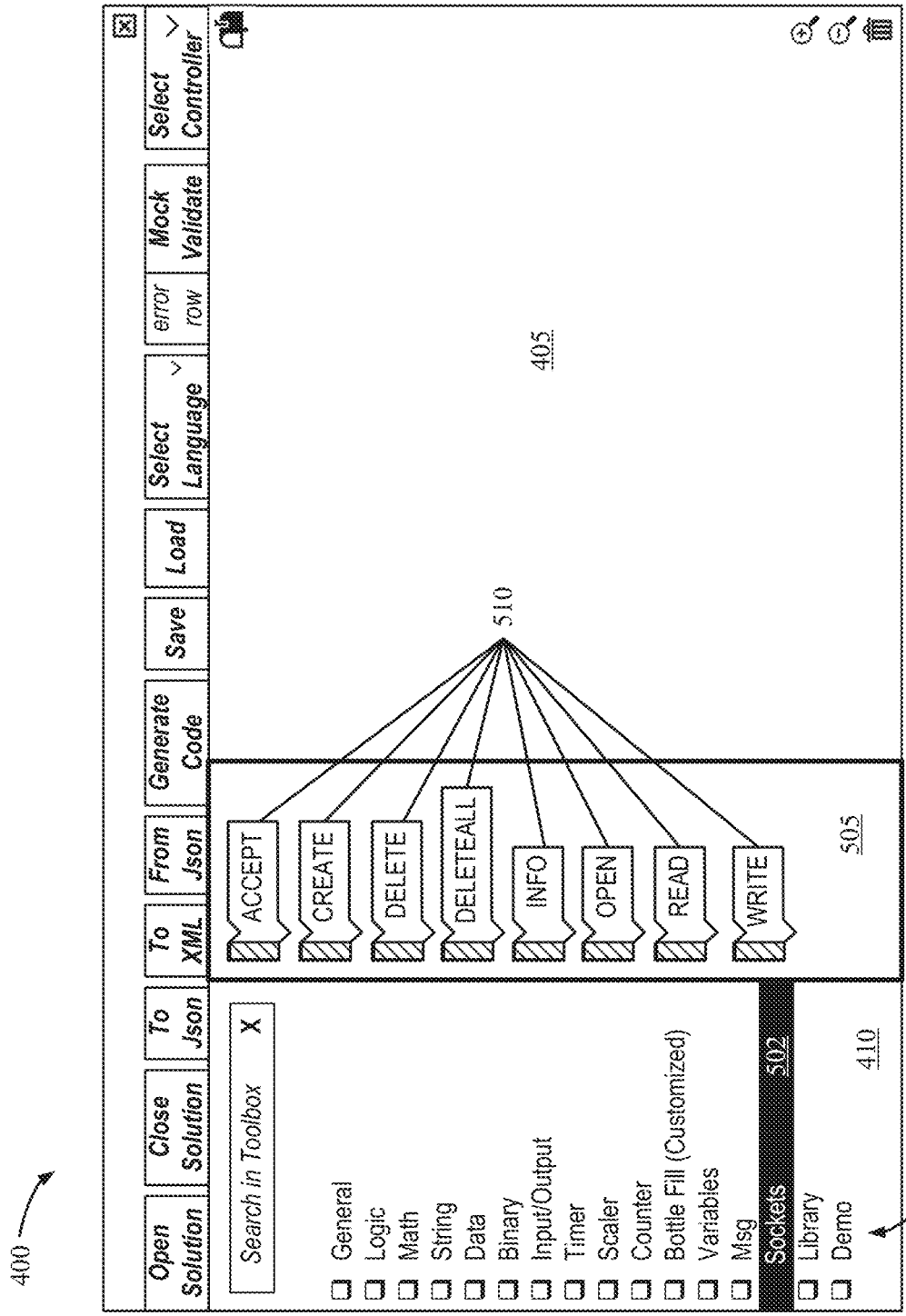
FIG. 5 illustrates an example user interaction with a selection panel of the graphical user interface of FIG. 4 according to some configurations.

With reference to FIG. 4, a user may interact with the selection panel 410 by selecting a function category included in the set of function categories 415. In response to selecting a function category, the electronic processor 200 may generate (or otherwise provide) a function subpanel including a set of functions associated with or included in the selected function category (e.g., via the GUI 400). As one example, FIG. 5 illustrates a user interaction with the selection panel 410 according to some configurations. As illustrated in FIG. 5, a user may select a sockets category (represented in FIG. 5 by reference numeral 502). In response to the user selection of the sockets category, the electronic processor 200 may generate a function subpanel 505 as illustrated in the example of FIG. 5. In the illustrated example, the function subpanel 505 includes a set of socket related functions 510 (e.g., socket instructions). A socket instruction may be used for communication between PLCs (e.g., the industrial controllers 155). In some examples, a user may utilize socket instructions to create, open, and delete socket connections. For instance, as illustrated in FIG. 5, the function subpanel 505 may include an "ACCEPT" function, a "CREATE" function, a "DELETE" function, a "DELETEALL" function, an "INFO" function, an "OPEN" function, a "READ" function, and a "WRITE" function. In some configurations, the function subpanel 505 may include additional, different, or fewer functions than illustrated in FIG. 5 in various configurations.

In some configurations, the electronic processor 200 may generate (or otherwise provide) the set of functions 510 as a plain-text listing of available functions for a selected function category. Alternatively, or in addition, in some configurations, the electronic processor 200 may generate a graphical representation for one or more of the functions included in the set of functions 510. For example, as illustrated in FIG. 5, the function subpanel 505 may include a graphical representation for each function 510 included in the sockets category 502. In some configurations, the graphical representation of a function may be a preview version, a detailed version, or the like. A preview version may be a simplified, less detailed graphical representation of a function. A detailed version may be a complex, more detailed graphical representation of a function. In some configurations, the detailed version may enable user interaction, such as, e.g., receipt of user inputs associated with the function.

Figure 6:
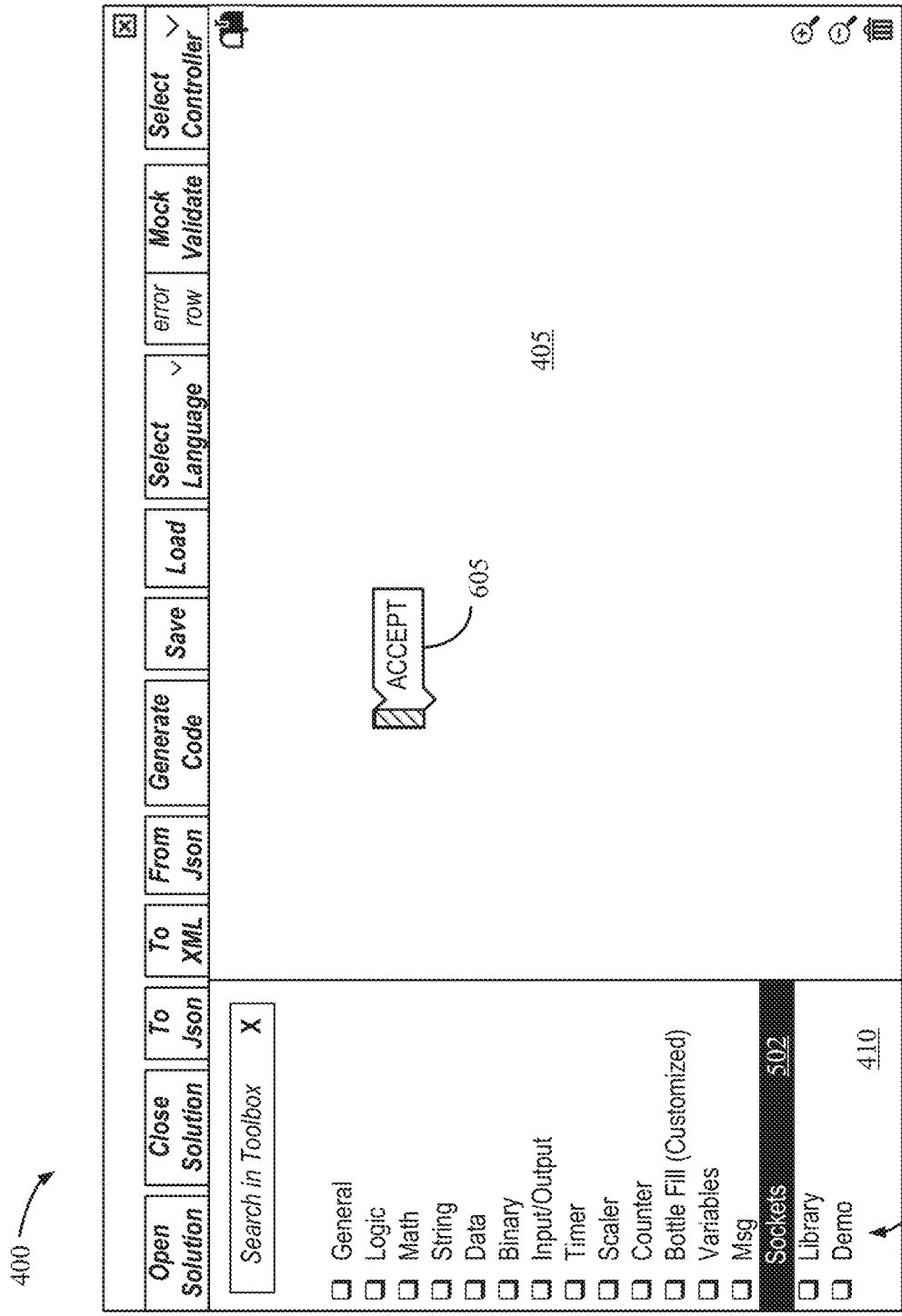
FIG. 6 illustrates an example user interaction selecting a function from a function subpanel of the graphical user interface of FIG. 4 according to some configurations.

A user may select one or more functions from the function subpanel 505 (e.g., for inclusion in an executable code file being built by the user within the workspace 405). For instance, a user may interact with a function (e.g., via a mouse click or double-click) to select the one or more functions from the function subpanel 505. Alternatively, or in addition, a user may interact with a function by performing a drag-and-drop operation with respect to the selected one or more functions from the function subpanel 505. For instance, as illustrated in FIG. 6, a user may interact with an "ACCEPT" function (represented in FIG. 6 by reference numeral 605) by dragging and dropping the "ACCEPT" function 605 from the function subpanel 505 to the workspace 405.

Returning to FIG. 3, the electronic processor 200 may generate a graphical representation of the function (at block 315). In some configurations, the electronic processor 200 generates the graphical representation within (or for display within) the GUI (e.g., the GUI 400). The graphical representation may be a visual representation or depiction of a function (e.g., a visual function instance). As one example, a graphical representation may be a block (or other shape) that may be manipulated and configured within the workspace 405, where the block represents a particular code function. Accordingly, in some configurations, the graphical representation may be referred to as an instruction block, a code block, a function block, etc.

The graphical representation may include one or more user interface elements or components, such as, e.g., an input control component, a navigational component, an informational component, etc. For instance, the graphical representation may include an identifier of the function (e.g., a function name, such as, e.g., "DELETEALL"), a category identifier of the function (e.g., a category name, such as, e.g., sockets), additional information associated with the function (e.g., a common use case for the function, a function description, an implementation suggestion or recommendation, a listing of associated parameters, a set of implementation instructions, etc.), and the like. In some configurations, the graphical representation includes one or more interactive components (e.g., interactive GUI components or elements). An interactive component may include an input control, such as, e.g., a checkbox, a radio button, a drop-down list, a list box, a button, a toggle, a text field, a date field, etc. In some configurations, an interactive component may receive a parameter for configuring a function (also referred to herein as a configuration parameter). A parameter may refer to a parameter type, a parameter value, etc. As one example, in some configurations, a user may interact with an interactive component to select a parameter type (e.g., a time parameter, an input pin parameter, etc.). As another example, in some configurations, a user may interact with an interactive component to select a parameter value (e.g., a value for a parameter type, such as "5" or "PIN_7").

In some configurations, the set of interactive components may be specific or custom to a particular function. For instance, the electronic processor 200 may generate a graphical representation specific to each function, where the graphical representation includes a specific set of interactive components based on which function was selected. As one example, when the electronic processor 200 receives a selection of a first function, the electronic processor 200 may generate a first graphical representation of the first function, where the first graphical representation includes a first set of interactive components. When the electronic processor 200 receives a selection of a second function, the electronic processor 200 may generate a second graphical representation of the second function, where the second graphical representation includes a second set of interactive components. Following this example, in some configurations, the first set of interactive components may be different than the second set of interactive components (e.g., at least one interactive component of the first set of interactive components is different than the second set of interactive components). Accordingly, in some configurations, each graphical representation generated by the electronic processor 200 may be specific (or custom) to an associated function (e.g., an associated selected function).

Figure 7:
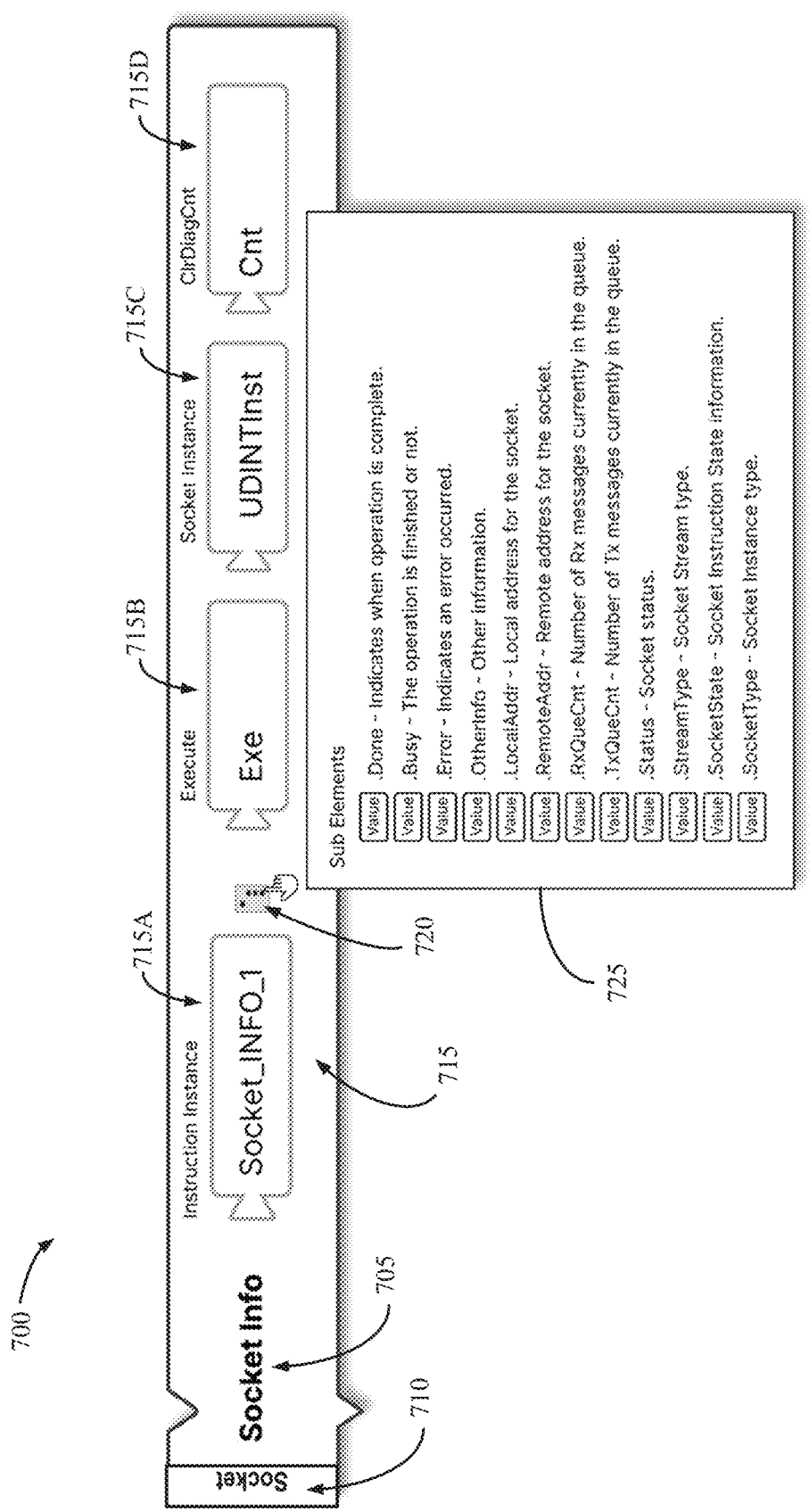
FIG. 7 illustrates an example graphical representation of a function according to some configurations.

As one example, FIG. 7 illustrates an example graphical representation 700 according to some configurations. In the illustrated example of FIG. 7, the graphical representation 700 is a visual representation (e.g., a block) for a "Socket Info" function. A "Socket Info" function (or instruction) may return (or otherwise provide) information of a socket instance, such as, e.g., error codes, execution status, etc. The graphical representation includes an identifier of the function, as "Socket Info" (represented in FIG. 7 by reference numeral 705), a category identifier of the function, as "Socket" (represented in FIG. 7 by reference numeral 710), and a set of interactive components 715, including a first interactive component 715A, a second interactive component 715B, a third interactive component 715C, and a fourth interactive component 715D. The first interactive component 715A is associated with an Instruction Instance parameter (e.g., an instance identification of the socket connection), the second interactive component 715B is associated with an Execute parameter (e.g., a parameter to enable the "Socket Info" function or instruction), the third interactive component 715C is associated with a Socket Instance parameter, and the fourth interactive component 715D is associated with a ClrDiagCnt parameter. The ClrDiagCnt parameter may represent a parameter to clear a diagnostic counter in transmission control protocol (TCP) or user datagram protocol (UDP). For instance, when the ClrDiagCnt parameter is set to "TRUE", the diagnostic counter information of TCP or UDP communication will be cleared. In the example of FIG. 7, the interactive components 715 are depicted as text fields configured to receive input from a user. However, in some configurations, the interactive components 715 may include additional, different, or fewer interactive components 715 in different configurations.

As illustrated in FIG. 7, the graphical representation 700 also includes a drop-down menu 720 (as an additional interactive component). As illustrated in FIG. 7, when a user interacts with the drop-down menu 720, the electronic processor 200 may generate a sub-element panel 725. The sub-element panel 725 may include a set of sub-elements associated with the selected function, a parameter of the selected function, or a combination thereof. In the illustrated example of FIG. 7, the sub-element panel 725 is associated with an Instruction Instance parameter (e.g., the first interactive component 715A). Accordingly, the sub-elements listed in the sub-element panel 725 may be associated with or relate to the Instruction Instance parameter. The set of sub-elements may include variables that a user may assign to the parameter of the "Socket Info" instruction or function.

When a user selects a sub-element, a corresponding variable value block may be generated.

Accordingly, in some configurations, the electronic processor 200 may generate a graphical representation for a selected function by generating a structured (or pre-structured) instance of the selected function. For instance, a function may not properly execute without certain parameters being established or configured. As such, the electronic processor 200 may generate the graphical representation for that function such that the graphical representation includes those parameters to ensure the function is properly configured for execution. As one example, proper execution of a function may involve configuring a first parameter and a second parameter. Accordingly, the electronic processor 200 may generate a graphical representation for the function that includes a first interactive component for the first parameter and a second interactive component for the second parameter.

In some configurations, the electronic processor 200 may generate a graphical representation for a function involving a particular parameter type, such as, e.g., a variable, an integer, a floating point, a string, a character, a Boolean, a date, a time, etc. FIGS. 8A-8D illustrate example graphical representations for parameters according to some configurations.

Figure 8A:
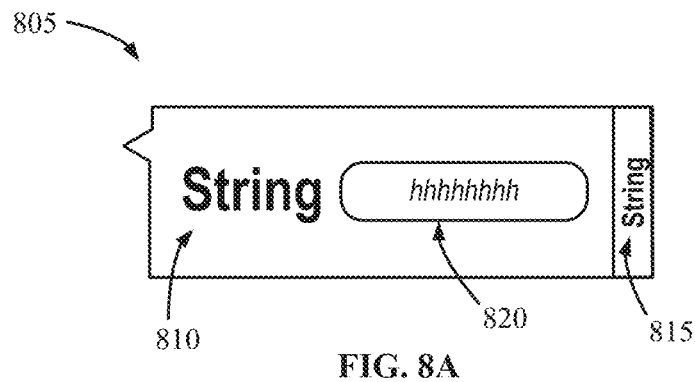
FIG. 8A illustrates a graphical representation for a string parameter or input according to some configurations.

FIG. 8A illustrates a graphical representation 805 for a string parameter or input according to some configurations. In the example of FIG. 8A, the graphical representation 805 includes an identifier of the function (e.g., "String") (represented in FIG. 8A by reference numeral 810), a category identifier of the function (e.g., "String") (represented in FIG. 8A by reference numeral 815), and an interactive component (depicted in FIG. 8A as a text field 820). As one example, a user may interact with the graphical representation 805 to input (or otherwise provide) a string (as a configuration parameter for a function). For instance, in some configurations, a user may interact with the graphical representation 805 by establishing a relationship between the graphical representation 805 and another graphical representation (e.g., a relationship between the string and another function) included within the workspace 405.

Figure 8B:
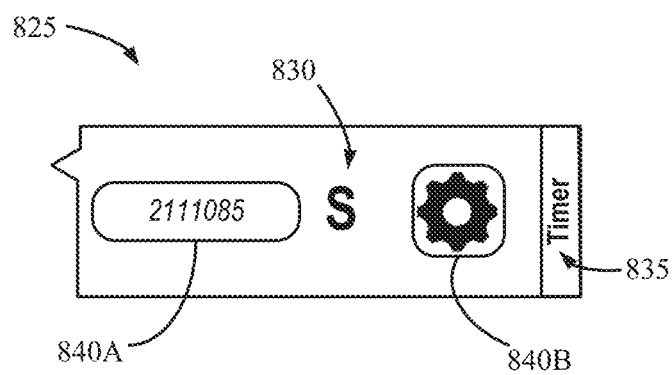
FIG. 8B illustrates a graphical representation for a time parameter or input according to some configurations.

FIG. 8B illustrates a graphical representation 825 for a time parameter or input according to some configurations. In the example of FIG. 8B, the graphical representation 825 includes an identifier of a unit of measurement for the function (e.g., as seconds, "S") (represented in FIG. 8B by reference numeral 830), a category identifier of the function (e.g., "Timer") (represented in FIG. 8B by reference numeral 835), and a set of interactive components (depicted in FIG. 8B as a text field 840A and a button 840B). As one example, a user may interact with the graphical representation 825 to input (or otherwise provide) a time value (as a configuration parameter for a function). When the electronic processor 200 detects a user interaction with the button 840B, the electronic processor 200 may prompt the user for one or more settings associated with the function. As one example, the electronic processor 200 may prompt the user to select a unit of measurement for the function (e.g., changing the unit of measurement to a different unit of measurement).

Figure 8C:
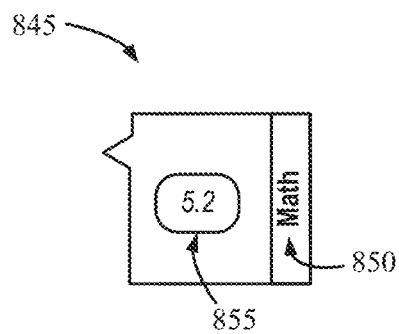
FIG. 8C illustrates an example graphical representation for a floating-point numerical parameter or input according to some configurations.

FIG. 8C illustrates an example graphical representation 845 for a numerical parameter or input according to some configurations. In the example of FIG. 8C, the graphical representation 845 includes a category identifier of the function (e.g., "Math") (represented in FIG. 8C by reference numeral 850) and an interactive component (represented in FIG. 8C as a text field 855). As one example, a user may interreact with the graphical representation 845 to input (or otherwise provide) a numerical value (as a configuration parameter for a function), where the numerical value is a floating-point number.

Figure 8D:
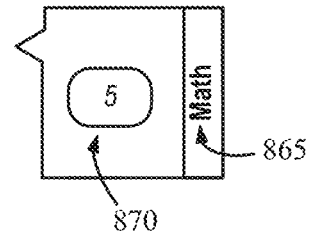
FIG. 8D illustrates an example graphical representation for an integer numerical parameter or input according to some configurations.

FIG. 8D illustrates an example graphical representation 860 for a numerical parameter or input according to some configurations. In the example of FIG. 8D, the graphical representation 860 includes a category identifier of the function (e.g., "Math") (represented in FIG. 8D by reference numeral 865) and an interactive component (represented in FIG. 8D as a text field 870). As one example, a user may interact with the graphical representation 860 to input (or otherwise provide) a numerical value (as a configuration parameter for a function), where the numerical value is an integer.

Returning to FIG. 3, the electronic processor 200 may receive a set of parameters for configuring the function (at block 320). In some configurations, the electronic processor 200 may receive the set of parameters as user interactions with one or more interactive components included in the GUI. In some configurations, the set of parameters may include a variable, an integer, a floating point, a string, a character, a Boolean, a date, a time, another parameter type, or a combination thereof. Alternatively, or in addition, in some configurations, the set of parameters may include a selection from a pre-structured list of parameter inputs (e.g., a selection from a drop-down menu). Alternatively, or in addition, in some configurations, the set of parameters may include an indication of whether or not a check-box element included in the graphical representation is "checked" or "active."

In some configurations, the electronic processor 200 may generate an updated graphical representation for the function by dynamically modifying the first set of interactive components based on at least one of the received parameters. For instance, the set of parameters for configuring a function may be dynamically adjusted based on at least one of the parameters included in the set of parameters. The inclusion of one parameter may be dependent on another parameter. For example, when the electronic processor 200 receives a first input for a first parameter, the electronic processor 200 may determine that a second parameter is no longer necessary for configuring the associated function based on the first input for the first parameter. As one example, when the graphical representation includes a first parameter and a second parameter for configuring a function, the electronic processor 200 may update or modify the graphical representation by removing the second parameter based on the first parameter, modify the second parameter (e.g., alter options included in a drop-down menu, etc.), adding a third parameter (e.g., a sub-parameter associated with the first parameter), etc.

In some configurations, the electronic processor 200 may receive a user input defining a code section. A code section may represent, e.g., a grouping of one or more code blocks or graphical representations. In some configurations, the electronic processor 200 may generate a graphical representation of a code section, where the graphical representation provides a visual indication of which code blocks or graphical representations of functions are included within the code section. In some configurations, the code section may be expandable and collapsible such that the one or more code blocks or graphical representations of functions may be hidden (when the code section is collapsed) or may be visible (when the code section is expanded).

Figure 9A:
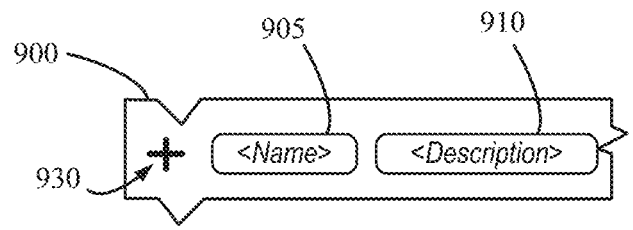
FIG. 9A illustrates an example graphical representation of a code section in a collapsed state according to some configurations.
Figure 9B:
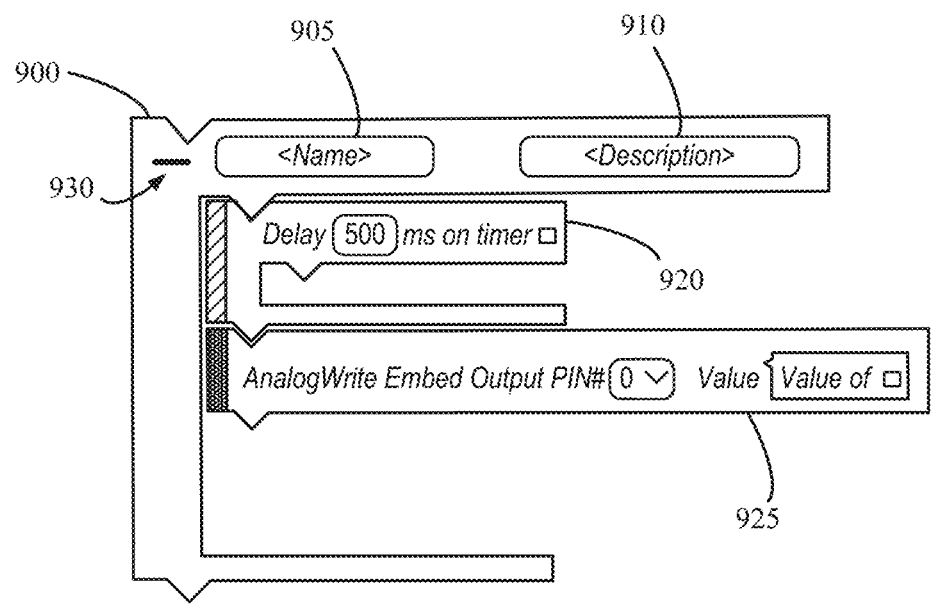
FIG. 9B illustrates an example graphical representation of a code section in an expanded state according to some configurations.

FIGS. 9A-9B illustrates an example graphical representation 900 of a code section according to some configurations. As illustrated in FIG. 9A, the graphical representation 900 includes a first text field 905 for receiving a name (or other identifier) for the code section and a second text field 910 for receiving a description for the code section. Accordingly, in some configurations, a user may provide custom names (via the first text field 905), custom descriptions (via the second text field 910), or a combination thereof for a code section. A user may interact with the graphical representation 900 by positioning (or otherwise associating) one or more functions (or graphical representations thereof) within the graphical representation 900. As one example, as illustrated in FIG. 9A, the graphical representation 900 includes a first graphical representation 920 for a first function (e.g., a delay function) and a second graphical representation 925 for a second function (e.g., an Analog Write function).

As also illustrated in FIG. 9A, the graphical representation 900 may include an expand/collapse element 930 for expanding or collapsing the code section (e.g., the graphical representation 900). When a user interacts with the expand/collapse element 930, the graphical representation 900 may expand such that graphical representation(s) included within the code section are visible (or displayed) within the workspace 405 or may collapse such that graphical representation(s) included within the code section are not visible (or not displayed) within the workspace 405. FIG. 9B illustrates the graphical representation 900 in a collapsed state (e.g., where the graphical representation(s) included within the code section are not visible). FIG. 9A illustrates the graphical representation 900 in an expanded state.

In some configurations, the electronic processor 200 may generate a set of text-based programming language instructions corresponding with one or more graphical representations included in the workspace 405. For instance, the electronic processor 200 may generate text-based programming language instructions equivalent to the one or more graphical representations. In some configurations, the electronic processor 200 may generate the set of text-based programming language instructions in response to a request from a user. The text-based programming language may include, e.g., a structured text programming language. Alternatively, or in addition, the text-based programming language may include other types of text-based programming languages. Accordingly, in some configurations, the electronic processor 200 may enable a user to switch back and forth between a visual programming environment and a text-based programming environment, such that a user may either edit and build a program using visual graphical representations of various code functions (within the visual programming environment) or using text-based programming (within the text-based programming environment). Accordingly, in some configurations, the electronic processor 200 may convert the visual programming version to corresponding text-based programming language instructions. The electronic processor 200 may receive a user interaction with the set of text-based programming language instructions (e.g., via the GUI). The user interaction may include a modification to the set of text based-programming language instructions. The electronic processor 200 may then implement the modification such that when the electronic processor 200 generates a code file (as described in greater detail herein), the code file includes the modification.

Returning to FIG. 3, the electronic processor 200 may generate a code file (e.g., the code file 225) for executing the function based on the set of parameters (at block 325). As noted herein, the code file 225 may be an electronic file including a set (or sequence) of machine-readable or executable instructions for performing a task or function (e.g., the function as configured by the set of parameters). Accordingly, in some configurations, the electronic processor 200 may configure (or otherwise compile) the function(s) included in the workspace 405 based on one or more parameters provided for configuring the function(s) as a code file. In some configurations, the code file 225 may instructions for performing one or more configured functions. In some configurations, the electronic processor 200 may transmit the code file 225 to the industrial controller 155 for deployment (or implementation) within the industrial system 105. Alternatively, or in addition, the electronic processor 200 may store the code file 225 in, e.g., the memory 205, as illustrated in FIG. 2.

In some configurations, the electronic processor 200 may generate the code file 225 by accessing a template version of the set of computer executable instructions for the function (e.g., a default or configurable version). The electronic processor 200 may update, based on the set of parameters, the template version of the set of computer executable instruction for the function. In some configurations, the electronic processor 200 may update the template version by modifying the set of computer executable instructions for the function to include (or integrate) the set of parameters. In some configurations, the electronic processor 200 may update the template version by modifying one or more instructions (e.g., by altering a syntax, removing an instruction, adding a new instruction, reordering one or more instructions, changing a structure of the set of instructions, etc.). Alternatively, or in addition, in some configurations the electronic processor 200 may update the template version by adding a parameter or value to an instruction (e.g., adding an integer value to an instruction). The electronic processor 200 may generate a configured version of the set of computer executable instructions for the function, where, when the configured version of the set of computer executable instructions is executed, the function is executed based on the set of parameters. For instance, in some configurations, the electronic processor 200 may access the template version of instructions for the function and supplement the template version with the set of parameters to generate the configured version (e.g., a version combining the pre-structured instructions for the function and the set of parameters).

Accordingly, a template version may refer to a pre-structured, configurable version of the computer executable instructions for the function. The template version may be an incomplete version in the sense that one or more parameters for the function are not yet defined (or integrated) within the instructions. A configured version may include the pre-structured set of computer executable instructions that includes the one or more parameters for the function. As one example, when the function is a delay function, the template version includes the pre-structured, configurable set of computer executable instructions for executing the delay function, but may be missing a delay value or parameter defining a duration of the delay. Following this example, the configured version may include the pre-structured set of computer executable instructions for executing the delay function with the delay parameter.

Figure 10A:
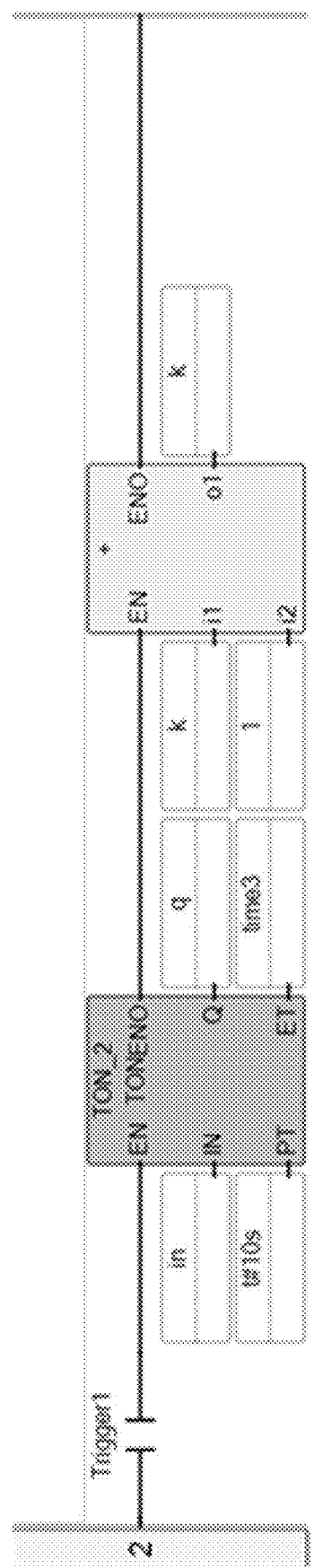
FIG. 10A illustrates a delay function as a ladder diagram according to some configurations.
Figure 10C:
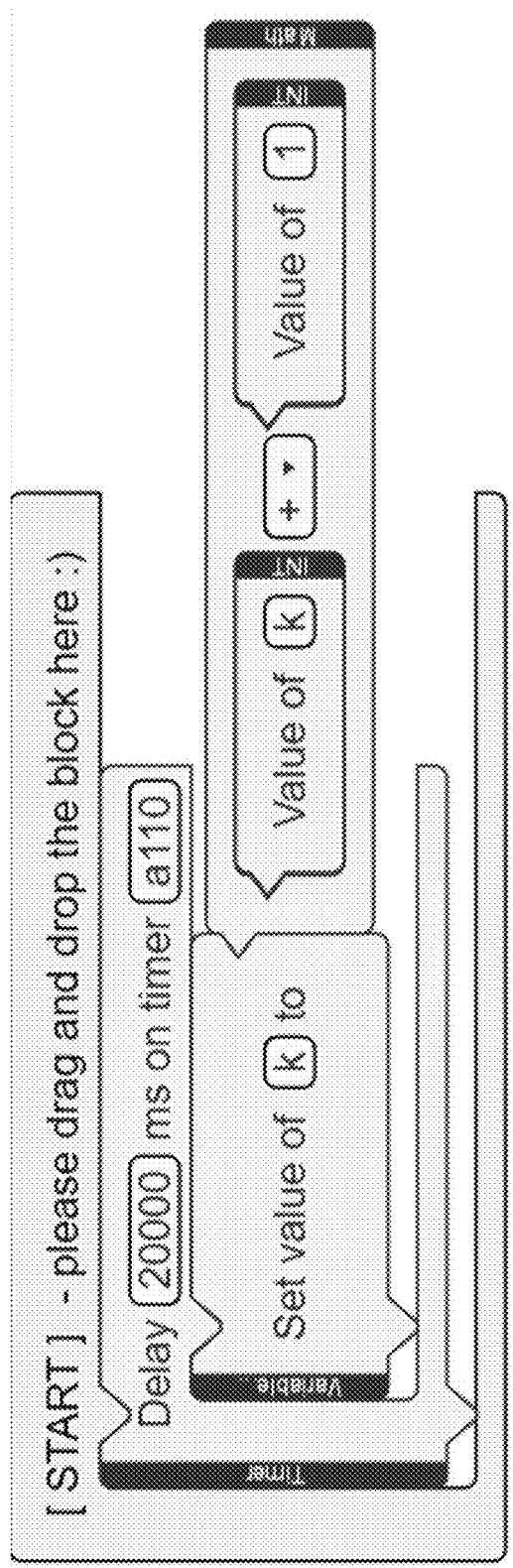
FIG. 10C illustrates the delay function built using the visual programming techniques described herein.

FIGS. 10A-10C illustrate example programming approaches for programming a delay function for deployment within an industrial system (e.g., the industrial system 105) according to some configurations. FIG. 10A illustrates a delay function as a ladder diagram according to some configurations. FIG. 10B illustrates the delay function as structured text according to some configurations. FIG. 10C illustrates the delay function built using the visual programming techniques described herein. As is illustrated by FIGS.

10A-10C, the delay function of FIG. 10C is more compact and readable in comparison to the delay functions of FIGS. 10A-10B. Additionally, the delay function of FIG. 10C is more readily understood by a user having little to no programming experience. Accordingly, as described herein, and as specifically illustrated by FIGS. 10A-10C, the technology disclosed herein provides advantages and improvements over prior PLC programming approaches, including, e.g., ladder diagrams, structured text, etc.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system of visual programming for industrial systems, the system comprising:
    an electronic processor configured to:
        generate a graphical user interface (GUI) for programming an industrial controller;
        receive a first selection of a first function from a plurality of functions, wherein each function of the plurality of functions is associated with a set of computer executable instructions;
        generate, within the GUI, a first graphical representation of the first function, the first graphical representation including a first set of interactive components for receiving one or more parameters specific to configuring the first function;
        receive, via the first set of interactive components, a first set of parameters for configuring the first function;
        receive, via the GUI, a user input, the user input defining a code section including the first graphical representation;
        generate a second graphical representation of the code section, wherein the second graphical representation visually indicates inclusion of the first function within the code section; and
        generate a code file for executing the first function based on the first set of parameters.

2. The system of claim 1, wherein the electronic processor is configured to generate an updated graphical representation for the first function by dynamically modifying the first set of interactive components based on at least one of the parameters of the first set of parameters.

3. The system of claim 1, wherein the electronic processor is further configured to:
    receive a second selection of a second function from the plurality of functions;
    generate a third graphical representation of the second function, the third graphical representation including a second set of interactive components for receiving one or more parameters specific to configuring the second function; and
    receive, via the second set of interactive components, a second set of parameters for configuring the second function, wherein the second set of parameters includes at least one different parameter than the first set of parameters.

4. The system of claim 1, wherein the electronic processor is further configured to:
    collapse the second graphical representation, wherein, when the second graphical representation is collapsed, the first graphical representation of the first function is hidden.

5. The system of claim 1, wherein the first set of parameters includes at least one variable.

6. The system of claim 1, wherein the first set of parameters includes at least one of an integer, a floating point, a string, a character, a Boolean, a date, or a time.

7. The system of claim 1, wherein the first set of parameters includes a variable and at least one of an integer, a floating point, a string, a character, a Boolean, a date, or a time.

8. The system of claim 1, wherein the electronic processor is further configured to:
    generate a set of text-based programming language instructions corresponding with the first graphical representation; and
    transmit the set of text-based programming language instructions for display.

9. The system of claim 1, wherein the industrial controller is a programmable logic controller.

10. The system of claim 1, wherein the electronic processor is further configured to:
    transmit the code file to the industrial controller for deployment within an industrial system.

11. A method of visual programming for industrial systems, the method comprising:
    generating, with an electronic processor, a graphical user interface (GUI) for programming an industrial controller;
    receiving, with the electronic processor, a selection of a function from a plurality of functions, wherein each function of the plurality of functions is associated with a set of computer executable instructions;
    generating, with the electronic processor, within the GUI, a graphical representation of the function, the graphical representation including a set of interactive components for receiving one or more parameters specific to configuring the function;

receiving, with the electronic processor, via the set of interactive components, a set of parameters for configuring the function;

generating, with the electronic processor, a code file for executing the function based on the set of parameters by:

accessing a template version of the set of computer executable instructions for the function;

updating, based on the set of parameters, the template version of the set of computer executable instructions for the function; and generating a configured version of the set of computer executable instructions for the function, wherein, when the configured version of the set of computer executable instructions is executed, the function is executed based on the set of parameters; and deploying, with the electronic processor, the code file via the industrial controller for implementation within an industrial system.

12. The method of claim 11, further comprising:

generating a set of text-based programming language instructions corresponding with the graphical representation; and outputting, via the GUI, the set of text-based programming language instructions.

13. The method of claim 11, further comprising:

receiving, via the GUI, a user interaction with the set of text-based programming language instructions, the user interaction including a modification to the set of text based-programming language instructions.

14. The method of claim 13, wherein generating the code file includes generating the code file including the modification.

15. The method of claim 11, wherein receiving the set of parameters includes receiving at least one of a variable, an integer, a floating point, a string, a character, a Boolean, a date, or a time.

16. A non-transitory, computer-readable medium storing instructions that, when executed by an electronic processor, perform a set of functions, the set of functions comprising:

generating a graphical user interface (GUI) for programming an industrial controller;

receiving a first selection of a first function from a plurality of functions, wherein each function of the plurality of functions is associated with a set of computer executable instructions;

generating, within the GUI, a first graphical representation of the first function, the first graphical representation including a first set of interactive components for receiving one or more parameters specific to configuring the first function, wherein the first graphical representation is visually depicted as a geometric shape having a boundary line and the first set of interactive components are included inside the boundary line of the geometric shape;

receiving, via the first set of interactive components, a first set of parameters for configuring the first function;

generating a code file for executing the first function based on the first set of parameters; and deploying the code file via the industrial controller for implementation within an industrial system.

17. The computer-readable medium of claim 16, wherein the first set of parameters includes at least one of a variable, an integer, a floating point, a string, a character, a Boolean, a date, or a time.

18. The computer-readable medium of claim 16, wherein the set of functions further includes:

receiving a second selection of a second function from the plurality of functions;

generating a second graphical representation of the second function, the second graphical representation including a second set of interactive components for receiving one or more parameters specific to configuring the second function; and receiving, via the second set of interactive components, a second set of parameters for configuring the second function, wherein the second set of parameters includes at least one different parameter than the first set of parameters.

* * * * *